(12) United States Patent
Pabst et al.

(10) Patent No.: US 8,310,122 B2
(45) Date of Patent: Nov. 13, 2012

(54) CORE PLATE STACK ASSEMBLY FOR PERMANENT MAGNET ROTOR OR ROTATING MACHINES

(75) Inventors: Otto Pabst, Rio di Pusteria (IT); Franco Gadrino, Pianezza (IT)

(73) Assignee: Wilic S.A.R.L., Luxembourg (LU)

( * ) Notice: Subject to any disclaimer, the term of this patent is extended or adjusted under 35 U.S.C. 154(b) by 1066 days.

(21) Appl. No.: 12/095,297

(22) PCT Filed: Sep. 27, 2006

(86) PCT No.: PCT/IB2006/002679
§ 371 (c)(1),
(2), (4) Date: Oct. 13, 2008

(87) PCT Pub. No.: WO2007/063369
PCT Pub. Date: Jun. 7, 2007

(65) Prior Publication Data
US 2009/0096309 A1    Apr. 16, 2009

(30) Foreign Application Priority Data
Nov. 29, 2005 (IT) .............................. BZ2005A0063

(51) Int. Cl.
*H02K 21/12* (2006.01)
(52) U.S. Cl. ......... 310/156.18; 310/156.19; 310/156.21; 310/156.22; 310/156.61; 310/156.72; 310/216.113; 310/216.114; 310/216.125; 310/91; 29/598; 29/596
(58) Field of Classification Search ............. 310/156.18, 310/156.19, 156.21–156.22, 156.61, 156.72, 310/216.113–216.114, 216.125–216.129, 310/216.133–216.134, 91; 29/596–598
See application file for complete search history.

(56) References Cited

U.S. PATENT DOCUMENTS
1,894,357 A    1/1933    Manikowske
(Continued)

FOREIGN PATENT DOCUMENTS
CA    2 404 939    4/2004
(Continued)

OTHER PUBLICATIONS
International Preliminary Report on Patentability from corresponding foreign application (PCT/IB2006/002679), dated Jun. 3, 2008.
(Continued)

*Primary Examiner* — Quyen Leung
*Assistant Examiner* — Leda Pham
(74) *Attorney, Agent, or Firm* — Neal, Gerber & Eisenberg LLP (57) ABSTRACT

A rotating machine has a stator and a permanent magnet rotor that is more easily made, lower cost, and lighter by virtue of a plurality of permanent magnet assemblies mounted on a rotor body. Each magnet assembly includes two facing core plate stacks supporting a permanent magnet between them. Each core plate stack is made from a plurality of core plates of substantially identical size and shape and with on or more holes in substantially the same location to form respective bores in the stack. A tie rod is formed in each bore and retains the plates in a stack via bevels in the holes of the end plates. Preferably, the tie rods also apply compressive force as a result of placing the stacked plates in an injection mold, injecting plastic into the mold to fill each bore with plastic, and allowing the plastic to cure. As the plastic cures, it shrinks so that the tie rods pull the end plates together. To enhance the pressure, the stacked plates can be compressed before and during the injection process.

21 Claims, 3 Drawing Sheets

U.S. PATENT DOCUMENTS

| | | | |
|---|---|---|---|
| 1,948,854 A | 2/1934 | Heath | |
| 1,979,813 A | 11/1934 | Reis | |
| 2,006,172 A | 6/1935 | Klappauf | |
| 2,040,218 A | 5/1936 | Soderberg | |
| 2,177,801 A | 10/1939 | Arnold | |
| 2,469,734 A | 5/1949 | Ledwith | |
| 2,496,897 A | 2/1950 | Strickland | |
| 2,655,611 A | 10/1953 | Sherman | |
| 2,739,253 A | 3/1956 | Plumb | |
| 2,806,160 A | 9/1957 | Brainard | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijnst et al. | |
| 3,083,311 A | 3/1963 | Krasnow | |
| 3,131,942 A | 5/1964 | Ertaud | |
| 3,168,686 A | 2/1965 | King et al. | |
| 3,221,195 A | 11/1965 | Hoffmann | |
| 3,363,910 A | 1/1968 | Toronchuk | |
| 3,364,523 A | 1/1968 | Schippers | |
| 3,392,910 A | 7/1968 | Tanzberger | |
| 3,468,548 A | 9/1969 | Webb | |
| 3,700,247 A | 10/1972 | Butler et al. | |
| 3,724,861 A | 4/1973 | Lesiecki | |
| 3,746,349 A | 7/1973 | Smale et al. | |
| 3,748,089 A | 7/1973 | Boyer et al. | |
| 3,789,252 A | 1/1974 | Abegg | |
| 3,841,643 A | 10/1974 | McLean | |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer et al. | |
| 4,022,479 A | 5/1977 | Orlowski | |
| 4,061,926 A | 12/1977 | Peed | |
| 4,087,698 A | 5/1978 | Myers | |
| 4,273,343 A | 6/1981 | Visser | |
| 4,289,970 A | 9/1981 | Deibert | |
| 4,291,235 A | 9/1981 | Bergey, Jr. | |
| 4,292,532 A | 9/1981 | Leroux | |
| 4,336,649 A | 6/1982 | Glaser | |
| 4,339,874 A | 7/1982 | Mc'Carty et al. | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto et al. | |
| 4,398,773 A | 8/1983 | Boden et al. | |
| 4,452,046 A | 6/1984 | Valentin | |
| 4,482,831 A | 11/1984 | Notaras et al. | |
| 4,490,093 A | 12/1984 | Chertok et al. | |
| 4,517,483 A | 5/1985 | Hucker et al. | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada et al. | |
| 4,720,640 A | 1/1988 | Anderson | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,837,468 A * | 6/1989 | Froment | 310/216.083 |
| 4,866,321 A | 9/1989 | Blanchard et al. | |
| 4,900,965 A | 2/1990 | Fisher | |
| 4,906,060 A | 3/1990 | Claude | |
| 4,954,736 A * | 9/1990 | Kawamoto et al. | 310/156.21 |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,090,711 A | 2/1992 | Becker | |
| 5,091,668 A | 2/1992 | Cuenot et al. | |
| 5,177,388 A | 1/1993 | Hotta et al. | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase et al. | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Baek et al. | |
| 5,670,838 A | 9/1997 | Everton | |
| 5,696,419 A | 12/1997 | Rakestraw | |
| 5,704,567 A | 1/1998 | Maglieri | |
| 5,746,576 A | 5/1998 | Bayly | |
| 5,777,952 A | 7/1998 | Nishimura et al. | |
| 5,783,894 A | 7/1998 | Whither | |
| 5,793,144 A | 8/1998 | Kusase et al. | |
| 5,798,632 A | 8/1998 | Muljadi | |
| 5,801,470 A | 9/1998 | Johnson et al. | |
| 5,806,169 A * | 9/1998 | Trago et al. | 29/596 |
| 5,811,908 A | 9/1998 | Iwata et al. | |
| 5,814,914 A | 9/1998 | Caamaño | |
| 5,844,333 A | 12/1998 | Sheerin | |
| 5,844,341 A | 12/1998 | Spooner | |
| 5,857,762 A | 1/1999 | Schwaller | |
| 5,886,441 A | 3/1999 | Uchida et al. | |
| 5,889,346 A | 3/1999 | Uchida et al. | |
| 5,894,183 A | 4/1999 | Borchert | |
| 5,925,964 A | 7/1999 | Kusase et al. | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamano | |
| 6,013,968 A | 1/2000 | Lechner et al. | |
| 6,037,692 A | 3/2000 | Miekka et al. | |
| 6,047,460 A * | 4/2000 | Nagate et al. | 29/598 |
| 6,064,123 A | 5/2000 | Gislason | |
| 6,067,227 A | 5/2000 | Katsui et al. | |
| 6,089,536 A | 7/2000 | Watanabe et al. | |
| 6,093,984 A | 7/2000 | Shiga et al. | |
| 6,127,739 A | 10/2000 | Appa | |
| 6,172,429 B1 | 1/2001 | Russell | |
| 6,177,746 B1 | 1/2001 | Tupper et al. | |
| 6,193,211 B1 | 2/2001 | Watanabe et al. | |
| 6,194,799 B1 | 2/2001 | Miekka et al. | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi et al. | |
| 6,365,994 B1 | 4/2002 | Watanabe et al. | |
| 6,373,160 B1 | 4/2002 | Schrödl | |
| 6,376,956 B1 | 4/2002 | Hosoya | |
| 6,378,839 B2 | 4/2002 | Watanabe et al. | |
| 6,384,504 B1 | 5/2002 | Elrhart et al. | |
| 6,417,578 B1 | 7/2002 | Chapman | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka et al. | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,548,932 B1 | 4/2003 | Weiglhofer et al. | |
| 6,590,312 B1 | 7/2003 | Seguchi | |

| | | |
|---|---|---|
| 6,603,232 B2 | 8/2003 | Van Dine et al. |
| 6,617,747 B1 | 9/2003 | Petersen |
| 6,629,358 B2 | 10/2003 | Setiabudi |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Torres Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | Labath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes |
| 7,042,109 B2 | 5/2006 | Gabrys |
| 7,057,305 B2 | 6/2006 | Krügen-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes |
| 7,091,642 B2 | 8/2006 | Agnes |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,179,056 B2 | 2/2007 | Siegfriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza |
| 7,385,306 B2 | 6/2008 | Casazza |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151577 A1 | 8/2004 | Pierce et al. |
| 2004/0189136 A1 | 9/2004 | Kolomeitsev et al. |
| 2005/0000083 A1* | 1/2005 | Edwards et al. ............ 29/596 |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222226 A1 | 9/2007 | Casazza et al. |
| 2007/0222227 A1 | 9/2007 | Casazza et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CA | 2518742 | 9/2004 |
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 29706980 | 7/1997 |
| DE | 19636591 | 3/1998 |

| | | |
|---|---|---|
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 1 021 9190 | 11/2003 |
| DE | 10246690 | 4/2004 |
| DE | 102004018524 | 11/2005 |
| DE | 102004028746 | 12/2005 |
| EP | 0013157 | 7/1980 |
| EP | 0232963 | 8/1987 |
| EP | 0313392 | 4/1989 |
| EP | 0 495 872 | 7/1992 |
| EP | 0 627 805 | 12/1994 |
| EP | 1108888 | 6/2001 |
| EP | 1167754 | 1/2002 |
| EP | 1 289 097 | 3/2003 |
| EP | 1291521 | 3/2003 |
| EP | 1309067 | 5/2003 |
| EP | 1363019 | 11/2003 |
| EP | 1 375 913 | 1/2004 |
| EP | 1 394 406 | 3/2004 |
| EP | 1394451 | 3/2004 |
| EP | 1 589 222 | 10/2005 |
| EP | 1 612 415 | 1/2006 |
| EP | 1641102 | 3/2006 |
| EP | 1677002 | 7/2006 |
| EP | 1772624 | 4/2007 |
| EP | 1 780 409 | 5/2007 |
| EP | 1829762 | 9/2007 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 0/1914 |
| GB | 859176 | 1/1961 |
| GB | 1524477 | 9/1978 |
| GB | 1537729 | 1/1979 |
| GB | 2041111 | 9/1980 |
| GB | 2 050 525 | 1/1981 |
| GB | 2075274 | 11/1981 |
| GB | 2 131 630 | 6/1984 |
| GB | 2144587 | 3/1985 |
| GB | 2208243 | 3/1989 |
| GB | 2266937 | 11/1993 |
| GB | 2 372 783 | 9/2002 |
| JP | 57059462 | 4/1982 |
| JP | 03 145 945 | 6/1991 |
| JP | 05 122 912 | 5/1993 |
| JP | 6002970 | 1/1994 |
| JP | 06 269 141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 3 453 072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2 000 466 | 9/2003 |
| RU | 2229621 | 5/2004 |
| WO | WO8402382 | 6/1984 |
| WO | WO9105953 | 5/1991 |
| WO | 92/12343 | 7/1992 |
| WO | 97/30504 | 8/1997 |
| WO | 97/33357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | 00/01056 | 1/2000 |
| WO | 01/06623 | 1/2001 |
| WO | WO0106121 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | 01/35517 | 5/2001 |
| WO | WO0134973 | 5/2001 |
| WO | 01/69754 | 9/2001 |
| WO | 02/33254 | 4/2002 |
| WO | WO02057624 | 7/2002 |
| WO | WO02083523 | 10/2002 |
| WO | WO03036084 | 5/2003 |
| WO | 03/067081 | 8/2003 |
| WO | WO03076801 | 9/2003 |
| WO | 2004/017497 | 2/2004 |
| WO | WO2005103489 | 11/2005 |
| WO | WO2006013722 | 2/2006 |
| WO | WO2006032515 | 3/2006 |
| WO | 2007/063370 | 6/2007 |
| WO | WO2007063370 | 6/2007 |
| WO | WO2008078342 | 7/2008 |

OTHER PUBLICATIONS

Communication under Article 94(3) EPC from the EPO Examining Division regarding corresponding foreign application (EP 06 820 761), dated Apr. 3, 2009.

Maxime Dubois, Study of TFPM machines with toothed rotor applied to direct-drive generators for wind turbines, 2004.

Variable Speed Gearless Wind Turbine (website), http://www.mhi.cojp/msmw/mw/en/gearless.html, viewed on Sep. 22, 2006.

* cited by examiner

CORE PLATE STACK ASSEMBLY FOR PERMANENT MAGNET ROTOR OR ROTATING MACHINES

PRIORITY CLAIM

This application is a national stage application of PCT/IB2006/002679, filed Sep. 27, 2006, which claims the benefit of priority to Italian Application No. BZ2005A000063, filed Nov. 29, 2005, the entire contents of which are incorporated herein.

TECHNICAL FIELD

Embodiments disclosed herein relate to permanent magnet assemblies for rotating machines, such as wind turbines, rope driven and carried transport systems, electric generators and motors, particularly for electric generator and motor rotors. More particularly, embodiments relate to magnet holders in rotating machine rotors, such as rotors in wind turbines, wind mills, electric generators, electric motors, rope or cable based transport systems, and the like.

BACKGROUND

In power generating and working rotating machinery, such as wind machines and rope or cable driven and carried transport systems, relative motion between magnetic field generators and coils produces electricity, one of these groups being mounted on a rotor and the other group being mounted on a stator of the power generating machine. The magnetic field generators are typically windings, which are electromagnets supplied with a small portion of the output of the power generating machine. However, permanent magnets can instead be used to provide a magnetic field that induces electrical current in conductors when relative motion occurs between the magnets and the conductors. But permanent magnets are relatively heavy, and when used in large scale machinery, the apparatus used to hold the magnets in place can add substantially more undesirable weight, are difficult to install, are limited in the sizes of magnets they can accommodate, or are overly costly. For example, in some applications, the magnets are glued to a rotor body, the glue being applied under pressure. Additional applications use stampings over the ends of the magnets to hold them in place. Still other applications employ clamps, each clamp having an end attached to the underside of the rotor body and another end extending over the body of the magnet.

In known magnet assemblies, core plate stacks are used to support windings or magnets and shape the magnetic fields thereof. Such core plate stacks include a plurality of sheets of metal, such as metal stampings with desired profiles. The sheets are aligned and have through holes that form a bore through which preformed tie rods or bolts are inserted that hold the plate stacks together. In the known arrangements, the tie rods are attached to the end plates of their respective stacks in various ways.

An example of such known core plate stacks is disclosed in PCT application WO/97/30504, which also discloses a core plate stack production procedure. To form a core plate stack, a plurality of substantially identical sheets or plates are placed one atop another with end plates on either end of the stack. To hold the stack together, preformed tie bolts are inserted through bores formed by aligned through holes of the plates, but the tie rods are not secured to the end plates per se. Rather, the assembly of plates and tie rods is placed within a winding body that holds the stack and rods in place while the winding is installed and until the final assembly steps are performed. The final assembly steps include placing the winding, complete with core plate stack, tie rods, and winding body, into a mold and flooding the mold with a resin, allowing the resin to cure, and removing the resin-covered and -impregnated winding assembly from the mold. It should be noted that the preformed tie rods are disclosed as being steel or aluminum.

Such known core plate stacks and windings are relatively heavy due in part to the metal preformed tie rods and the extra end plates that are typically substantially thicker than the bulk of the plates in the stack. Additionally, because of the resin in which the winding and core plate stacks are embedded, it is nearly impossible to repair should anything go wrong or to swap out a part should an operating condition change. Additionally, such known core plate assemblies are not easily adapted to use with permanent magnets

SUMMARY

Embodiments disclosed herein overcome the difficulties of known magnet assemblies, eliminating adhesive, end overstamping, and resin impregnation. The core plate assembly of different embodiments disclosed herein is easier to manufacture, lighter than known assemblies, and is particularly suited to use with permanent magnets.

In one embodiment, a plurality of core sheets or plates in the form of metal stampings with identical profiles are created and placed in a stack. When used to support a magnet, two assemblies are used with one stack facing the other and flipped relative to the other stack. Each core plate has two through holes that are aligned throughout a given stack to create a bore. Two end plates with beveled through holes are placed on the stack with the larger diameters of the holes on the outer surface of the end plates. Molten plastic is poured or injected into the bores to form in situ or in place a plastic tie rod that, because of the bevels, draws the end plates toward each other as it cools, thus compressing the entire stack, permanently holding the stack together.

It should be noted that the core stack assembly procedure of embodiments disclosed herein could be applied to known core stacks, such as that disclosed in the international application discussed above. The core plates would be stacked and the end plates would be modified to have bevels in the tie rod bores. Plastic could then be injected into the tie rod bores and allowed to cure, forming the tie rods in situ and drawing the core plates together. The resulting compressed core stack would be lighter than that of WO/97/30504 and could be used in the winding body in place of the core plate stack disclosed therein.

In embodiments disclosed herein, each plate can include recesses that, when stacked, form a channel that can also receive plastic during an injection step. The completed stack would then include a tooth or section that could be used to hold a permanent magnet when two facing stacks and respective teeth or sections are employed.

Additionally, embodiments disclosed herein can employ variations in the profiles of the sheets or plates to accommodate support structures or other elements that will be used with the core plate stacks. For example, a recess can be formed that interacts with an element to be coupled to the stack, or a projection can be formed that will be received in a recess of a support structure.

BRIEF DESCRIPTION OF THE DRAWINGS

Embodiments will be described while referring to the accompanying drawings.

DESCRIPTION

Figure 1:
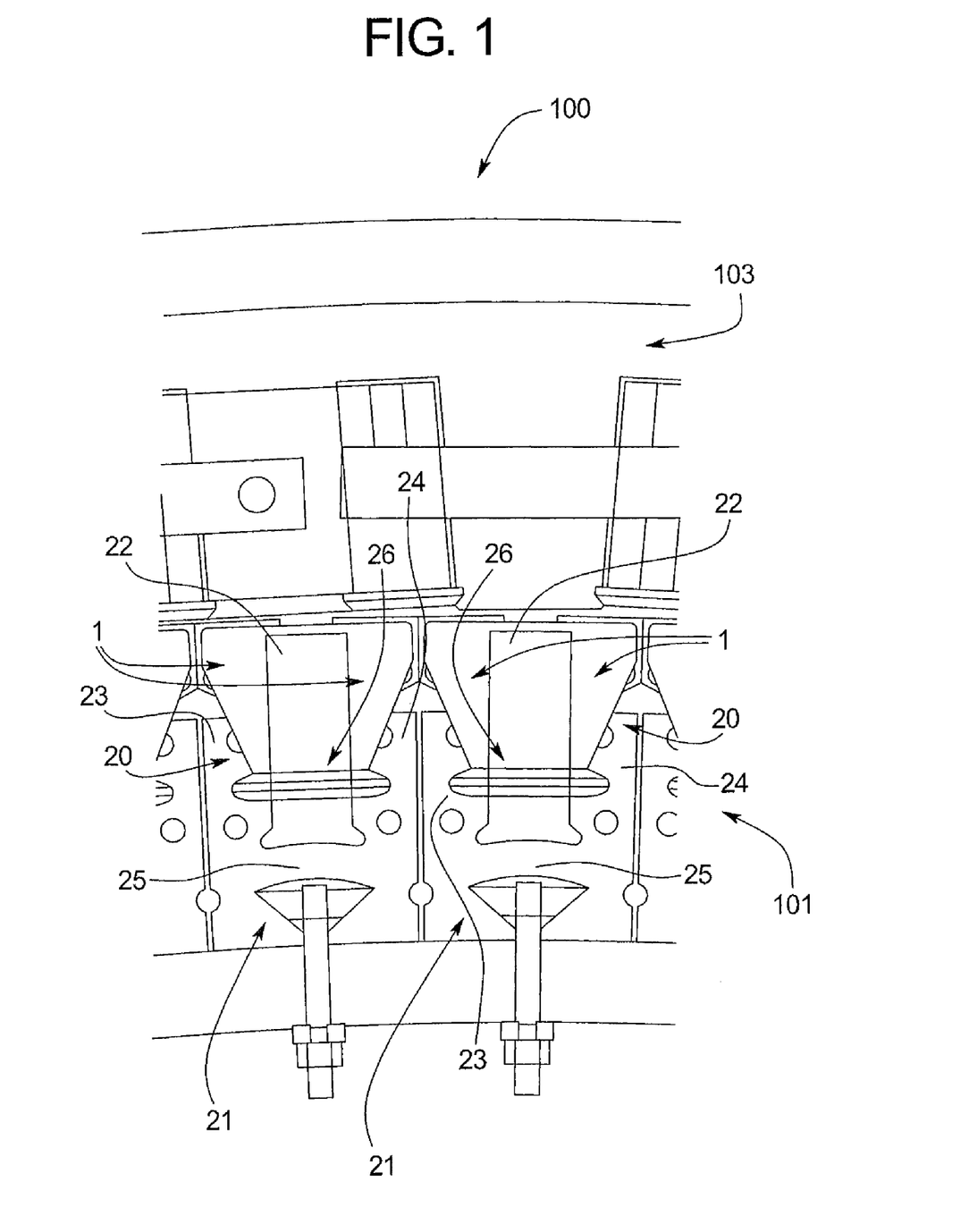
FIG. 1 shows a schematic cross section of a portion of a rotating machine, such as a wind turbine shown in FIG. 1.

Referring to FIG. 1, in one embodiment, a rotating machine 100, such as a wind turbine, includes a rotor 101 supported via a bearing by a stator 103. The rotor 101 includes a rotor body that supports a plurality of magnet assemblies 20, each including a magnet holder 21. A suitable magnet holder 21 is disclosed in copending international patent application PCT/IB/2006/002684, based on Italian Patent Application No. BZ2005A000062, which includes a pincer element with two claws 23, 24 that are connected by a flexible bridge 25. The claws 23, 24 form a seat 26 that can receive a portion of a magnet assembly 20. Each magnet assembly 20 includes two facing core plate stacks, such as the type of core plate stack 1 disclosed herein and as particularly seen in FIG. 2.

Figure 2:
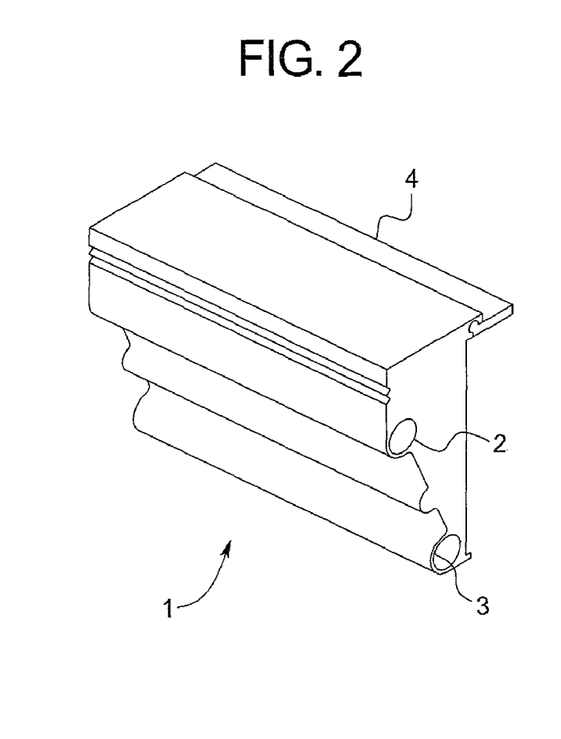
FIG. 2 shows a schematic elevation of a core plate stack according to embodiments disclosed herein.
Figure 3:
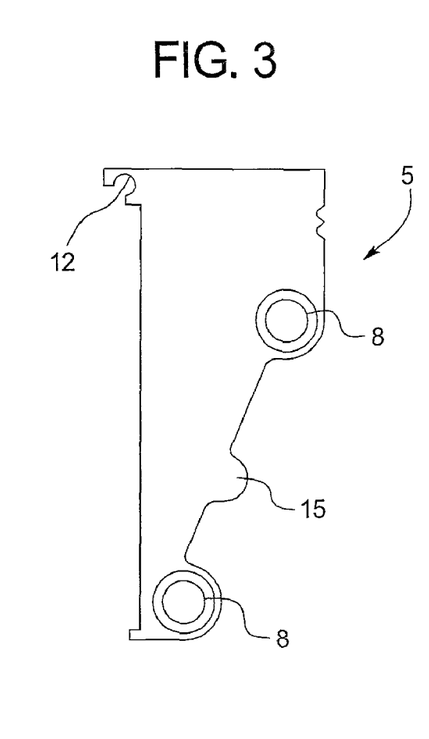
FIG. 3 shows a schematic plan view of a core plate stack end plate or sheet according to embodiments disclosed herein.
Figure 4:
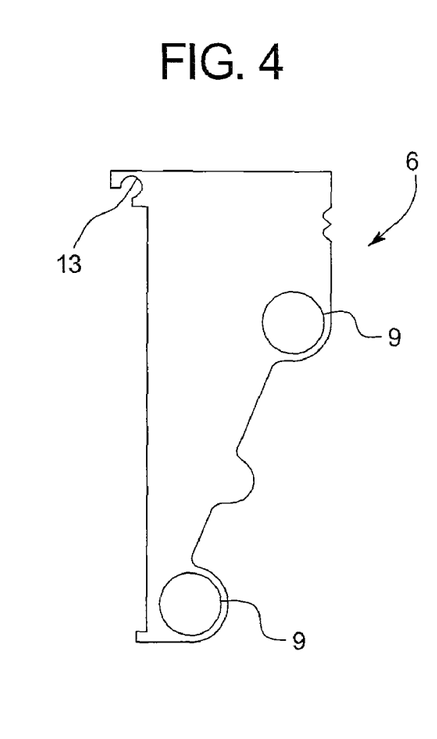
FIG. 4 shows a schematic plan view of a core plate stack internal plate according to embodiments disclosed herein.
Figure 5:
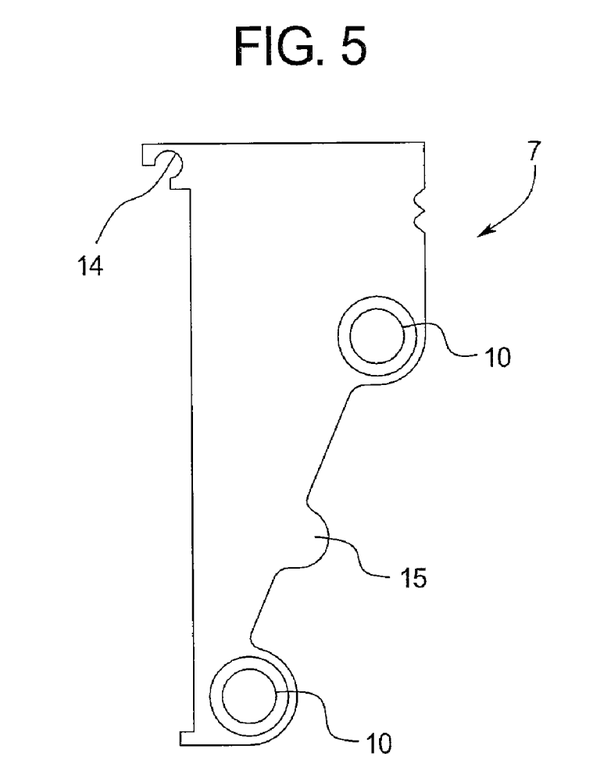
FIG. 5 shows a schematic plan view of another core plate stack end plate according to embodiments disclosed herein.
Figure 6:
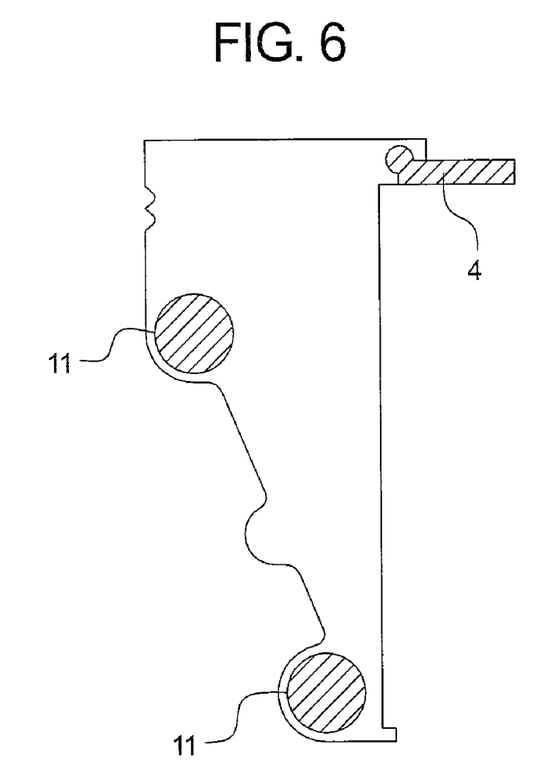
FIG. 6 shows a schematic plan view of a core stack plate with tie rods and finger according to embodiments disclosed herein.

Each core plate stack 1 of one embodiment disclosed herein is held together by tie rods 11 and preferably includes a finger 4 that can hold a permanent magnet 22 as disclosed in copending PCT application PCT/IB/2006/002684, based on Italian Patent Application No. BZ2005A000062. The core stack 1 includes a first end plate 5, an internal or intermediate core plate 6, and a second end plate 7, each of which are seen in FIGS. 2, 3, and 4, respectively. The first end plate 5 includes two through holes 8 that are beveled such that the inner, lower diameter is closer to an adjacent intermediate core plate 6. The first end plate's through holes 8 are formed to align with through holes 9 of the intermediate core plates 6 and through holes 10 of the second end plate 7. The through holes 9 of the intermediate core plates 6 preferably do not have bevels, while the through holes 10 of the second end plate 7 have bevels that, like the first end plate, have the smaller diameter closer to the respective adjacent intermediate core plate 6.

In one embodiment, with a plurality of the intermediate core plates 6 stacked between the first and second end plates 5, 7, their through holes 8, 9, 10 align to form bores into which plastic can be poured or injected to form in place or in situ a plastic bar or tie rod 11. For example, the core plate stack can be placed in an injection mold and plastic can be injected into the molded. The plastic fills in the bevels of the end plates 5, 7, and solidifies as it cools to form the bar or tie rod 11. Because of the plastic in the bevels, and because the plastic shrinks as it cools, the in situ formed tie rod 11 pulls the end plates S, 7 toward each other, compressing the entire stack of plates 5, 6, 7 and securing them tightly together. To enhance this effect, the stack can be compressed before injection of the plastic into the bores.

As seen in the FIGS., in different embodiments, the profile of the plates 5, 6, 7 can include features 12, 13, 14, 15, such as recesses 12, 13, 14 and projections 15, for engagement with other components. For example, the plates 5, 6, 7 can include recesses 12, 13, 14 that, when the plates are stacked, form a channel for holding a tooth 4 that can be used to hold a permanent magnet 22 of a magnet assembly 20 as discussed above.

The embodiments disclosed herein thus provide a simple, relatively inexpensive permanent magnet rotor for electricity producing wind machines. Forming a magnet assembly 20 by placing two core plate stacks 1 opposite one another with a permanent magnet 22 therebetween, then placing the stacks 1 and magnet 22 in a magnet holder 2, provides easy, relatively low-cost and lightweight rotor construction with permanent magnets. Additionally, while the rotor body 1 of embodiments has been described in the context of an electrical generator, specifically a wind-powered electrical generator, it should be noted that embodiments disclosed herein could be applied as the rotor body of an electric motor. Additionally, if the rotor body were linearized, the embodiments disclosed herein could be employed in a linear electric motor or generator without departing from the spirit of the invention.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A rotating machine comprising:
   a stator; and
   a rotor having:
      a rotor body, and
      a plurality of magnet holders mounted on the rotor body, the magnet holders configured to receive a plurality of magnet assemblies, each magnet assembly including two core plate stacks configured to support a permanent magnet, each core plate stack including:
         two end plates of substantially identical size and shape, each end plate defining at least one beveled through hole, a smaller diameter of each beveled through hole defined by one of said end plates being closer to the other end plate when the end plates are aligned;
         a plurality of intermediate core plates of substantially identical size and shape to each other and to the two end plates, each intermediate core plate defining a through hole corresponding to and aligned with a respective one of the at least one beveled through holes to form a plurality of respective bores extending between the end plates and through all of the intermediate plates; and
         a separate in situ plastic tie rod extending through each formed bore, each in situ plastic tie rod being distinct from the two end plates, each in situ plastic tie rod engaging the bevels of the respective beveled through holes of the two end plates to retain the end plates and the intermediate core plates in a stacked relationship to form said core plate stack.

2. The rotating machine of claim 1, wherein each plastic tie rod applies compressive force via the bevels to compress the core plate stack together.

3. The rotating machine of claim 1, wherein the two end plates and the intermediate core plates each include a plurality of aligned features configured to interact with a plurality of other components of the rotor.

4. The rotating machine of claim 3, wherein the aligned features comprise at least one recess that forms a channel in the assembled core plate stack.

5. The rotating machine of claim 4, wherein the channel is configured to receive a holding tooth that engages a permanent magnet in one of the magnet assemblies.

6. The rotating machine of claim 3, wherein the features comprise at least one projection configured to engage a corresponding recess of one of the magnet holders of the rotor.

7. A method of using each of a plurality of magnet holders on a rotor body of a wind turbine including a stator, a rotor with the rotor body, and a plurality of magnet assemblies in the magnet holders, each magnet holder having: two opposed claws connected by a bridge; a first seat formed on one side of the bridge by the claws; a second seat formed on another side of the bridge by a plurality of terminal expansions of the claws; and a tightening section configured to apply expansive force to the terminal expansions when the tightening section is drawn away from the bridge, the expansive force causing the claws to pivot about the bridge and apply compressive force at opposite ends of the claws from their terminal expansion ends; said method of using each magnet holder comprising:
stacking a plurality of intermediate plates with a plurality of end plates on either end of the stack, wherein each plate defines a beveled through hole, the plurality of beveled through holes defined by each of the plates are aligned to form a bore extending between the end plates and through the intermediate plates, and the plurality of end plates are each oriented with a smaller diameter of their beveled through holes closer to the plurality of intermediate stacks;
injecting a plastic into the bore formed by the aligned beveled through holes; and
allowing the plastic to cure to form at least one tie rod in situ which applies compressive force via the bevels to compress and hold the plates together, the in situ tie rod being distinct from the end plates.

8. The method of claim 7, further comprising trimming the plastic to be flush with a plurality of outer surfaces of the end plates.

9. The method of claim 7, further comprising placing the stack in an injection mold and injecting the plastic into the mold, thereby injecting the plastic into each bore.

10. The method of claim 7, further comprising compressing the stack and retaining the stack in a compressed state while injecting the plastic and while the plastic cures.

11. A wind machine permanent magnet rotor core plate stack comprising:
a plurality of intermediate core plates of substantially identical size and shape stacked in alignment, the core plates each defining a plurality of mutually aligned through holes forming at least one bore through the stack,
a first end plate on one end of the stack having substantially identical size and shape to the intermediate core plates and defining a beveled through hole with a smaller diameter equal to a diameter of a corresponding bore of the stack, the smaller diameter being adjacent a corresponding end of the stack,
a second end plate on another end of the stack having substantially identical size and shape to the intermediate core plates and defining a beveled through hole with a smaller diameter equal to a diameter of a corresponding bore of the stack, the smaller diameter being adjacent a corresponding end of the stack, and
an in situ formed tie rod formed in each bore to hold the plates together, the in situ formed tie rod being distinct from the two end plates and a first end of the in situ formed tie rod being flush with an outer surface of the first end plate and a second end of the in situ formed tie rod being flush with an outer surface of the second end plate.

12. The core plate stack of claim 11, wherein the tie rod applies compressive force on the end plates via the bevels of the end plate through holes.

13. The core plate stack of claim 11, wherein the tie rod is formed from a hardened fluid.

14. The core plate stack of claim 13, wherein the tie rod is made from a plastic.

15. The core plate stack of claim 14, wherein the tie rod is formed by placing the stack of intermediate core plates and end plates in an injection mold and injecting the plastic into the mold to fill each bore with the plastic, allowing the plastic to cure, and removing the stack from the mold.

16. A method of forming a core plate stack comprising:
stacking a plurality of intermediate core plates of substantially identical size and shape with their edges aligned, each of said plurality of intermediate core plates defining at least one hole, wherein the at least one hole of each intermediate core plate is aligned to form a respective bore;
placing two end plates of substantially identical size and shape with the intermediate core plates, each end plate defining a beveled hole corresponding to each of the at least one hole of the intermediate core plates, wherein each end plate is on a respective end of the stacked intermediate core plates;
forming a tie rod in situ in each bore to hold the stacked plates together by applying compressive force via the bevels of the end plates to compress the stacked plates together, wherein the tie rod is distinct from the two end plates; and
trimming the tie rod such that a first end of the tie rod is flush with an outer surface of a first of the two end plates and a second end of the tie rod is flush with an outer surface of a second of the two end plates.

17. The method of claim 16, wherein forming a tie rod in each bore comprises placing the stacked plates in an injection mold, injecting a plastic into the mold, and allowing the plastic to cure.

18. The method of claim 16, further comprising applying pressure to the stacked plates while forming the tie rods.

19. A method of forming a wind turbine core plate stack, said method comprising:
aligning at least two end plates and at least one intermediate plate between the end plates, the end plates and intermediate plate each defining at least one mutually aligned beveled hole forming at least one respective bore, and
for each formed bore, injecting a plastic into the formed bore to form a tie rod in situ to apply compressive force via the bevels to compress and hold the plates together, wherein the formed tie rod is distinct from the end plates and a first end of the tie rod is flush with an outer surface of a first of the end plates and a second end of the tie rod is flush with an outer surface of a second of the end plates.

20. The method of claim 19, further comprising stacking the plates before forming the tie rod.

21. The rotating machine of claim 1, wherein a first end of the in situ plastic tie rod is flush with an outer surface of a first of the two end plates and a second end of the in situ plastic tie rod is flush with an outer surface of a second of the two end plates.

* * * * *

UNITED STATES PATENT AND TRADEMARK OFFICE
CERTIFICATE OF CORRECTION

| | |
|---|---|
| PATENT NO. | : 8,310,122 B2 |
| APPLICATION NO. | : 12/095297 |
| DATED | : November 13, 2012 |
| INVENTOR(S) | : Otto Pabst and Franco Gadrino |

Page 1 of 1

It is certified that error appears in the above-identified patent and that said Letters Patent is hereby corrected as shown below:

On the Title Page, Item (54) and in the Specification, Column 1, Lines 1-3, title should read:
CORE PLATE STACK ASSEMBLY FOR PERMANENT MAGNET ROTOR OF ROTATING MACHINES On the Title Page, Item (73) should read:
Assignee: Wilic S.AR.L., Luxembourg (LU)

Signed and Sealed this
Fifth Day of August, 2014

Michelle K. Lee
*Deputy Director of the United States Patent and Trademark Office*